United States Patent
Tanrikulu et al.

(10) Patent No.: US 7,103,177 B2
(45) Date of Patent: Sep. 5, 2006

(54) REDUCED COMPLEXITY TRANSFORM-DOMAIN ADAPTIVE FILTER USING SELECTIVE PARTIAL UPDATES

(76) Inventors: Oguz Tanrikulu, 241Walnut St., Wellesley, MA (US) 02481; Kutluyil Dogancay, 6 Willow Crescent, Campbelltown SA 5074 (AU)

( * ) Notice: Subject to any disclaimer, the term of this patent is extended or adjusted under 35 U.S.C. 154(b) by 325 days.

(21) Appl. No.: 10/286,472

(22) Filed: Oct. 31, 2002

(65) Prior Publication Data

US 2003/0108192 A1 Jun. 12, 2003

Related U.S. Application Data

(60) Provisional application No. 60/396,298, filed on Jul. 16, 2002, provisional application No. 60/350,489, filed on Nov. 13, 2001.

(51) Int. Cl.
*G06F 17/10* (2006.01)
*H04B 3/23* (2006.01)

(52) U.S. Cl. ............................... 379/406.14; 708/322

(58) Field of Classification Search ............................... 379/406.12–406.14
See application file for complete search history.

(56) References Cited

U.S. PATENT DOCUMENTS 6,498,850 B1 * 12/2002 Walker et al. ......... 379/406.07
6,580,795 B1 * 6/2003 Li et al. ............... 379/406.14
6,842,516 B1 * 1/2005 Armbruster ........... 379/406.08

OTHER PUBLICATIONS

Aboulnasr, T.; Mayyas, K.;Complexity reduction of the NLMS algorithm via selective coefficient update; IEEE Transactions on Signal Processing, vol. 47, Issue 5, May 1999 pp. 1421-1424.*
Attallah, S.; Liaw, S.W.;Analysis of DCTLMS algorithm with a selective coefficient updating;IEEE Transactions on Circuits and Systems II: Analog and Digital Signal Processing, vol. 48, Issue 6, Jun. 2001 pp. 628-632.*
Oguz Tanrikulu and Kutluyil Dogancay, "Selective-partial-update proportionate normalized least-mean-squares algorithm for network echo cancellation," Acoustics, Speech and Signal Processing, 2002 IEEE International Conference, vol. 2, 2002, pp. 1889-1892.
Dogancay, Kutluyil and Tanrikulu, Oguz, "Generalized subband decomposition LMS algorithm employing selective partial updates," Acoustics, Speech and Signal Processing, 2002 IEEE International Conference, vol. 2. 2002, pp. 1377-1380.

(Continued)

*Primary Examiner*—Daniel Swerdlow
(74) *Attorney, Agent, or Firm*—Hamilton, Brook, Smith & Reynolds, P.C.

(57) ABSTRACT

A transform-domain adaptive filter uses selective partial updating of adaptive filter parameters. This updating may be based on a constrained minimization problem. The adaptive filter parameters are separated into subsets, and a subset is selected to be updated at each iteration. A normalization process applied to the frequency bins prior to multiplication by the adaptive filter parameters is used to prevent adaptive filter lock-up that may be experienced in the event of high energy levels of signals in particular frequency bins. Convergence of the transform domain filter is ensured at a rate generally faster than a corresponding time-domain adaptive filter. The transform-domain adaptive filter may be used for various applications, including system identification, channel equalization, or echo cancellation.

31 Claims, 11 Drawing Sheets

OTHER PUBLICATIONS

Dogancay, K. And Tanrikulu, O., "Adaptive filtering algorithms with Selective Partial Updates," Circuits and Systems II: Analog and Digital Signal Processing, IEEE Transactions, vol. 48, Issue 8, Aug. 2001, pp. 762-769.

Dogancay, K., and Tanrikulu, O., "Normalised constant modulus algorithm with selective partial update," Acoustics, Speech and Signal Processing, 2001, Proceedings, 2001 IEEE International Conference on, 2001, pp. 2181-2184, vol. 4.

Dogancay, K., Tanrikulu, O., "Selective-partial-update NLMS and affine projection algorithms for acoustic echo cancellation," Acoustics, Speech and Signal Processing, 2000, ICASSP '00. Proceedings 2000 International Conference on, vol. 1, 2000.

Duttweiler, D.L., "Proportionate Normalized Least-Mean-Squares Adaptation in Echo Cancelers," *IEEE Transactions on Speech and Audio Processing*, vol. 8, No. 5, pp. 508-518, Sep. 2000.

Gay, S.L., "An Efficient, Fast Converging Adaptive Filter for Network Echo Cancellation," *IEEE*, 0-7803-5148-Jul. 1998, pp. 394-398, 1998.

Pitas, I., "Fast Algorithms for Running Ordering and Max/Min Calculation," *IEEE Transactions on Circuits and Systems*, pp. 795-804, vol. 36, No. 6, Jun. 1989.

Series G: Transmission Systems and Media, Digital Systems and Networks, ITU-T Recommendation G.168.

Haykin, Simon, *Adaptive Filter Theory, 3rd Ed.*, Chapter 9, Prentice Hall, 1996.

Goodwin, G.C., and Kwai Sang Sin, *Adaptive Filtering Prediction and Control*, Chapter 3, Prentice Hall, 1984.

Jenkins, W.K., et al., *Advanced Concepts in Adaptive Signal Processing*, pp. 22-23, 54-277, Kluwer Academic Publishers.

Benesty, J., et al., *Advances in Network and Acoustic Echo Cancellation*, Springer, 2001.

U.S. Appl. No. 10/374,738, by Oguz Tanrikulu and Kutluyil Dogancay, filed Feb. 25, 2003.

* cited by examiner (PRIOR ART - ECHO CANCELLATION)

(PRIOR ART - SYSTEM IDENTIFICATION)

(PRIOR ART - CHANNEL EQUALIZATION)

(TIME DOMAIN ADAPTIVE FILTER)

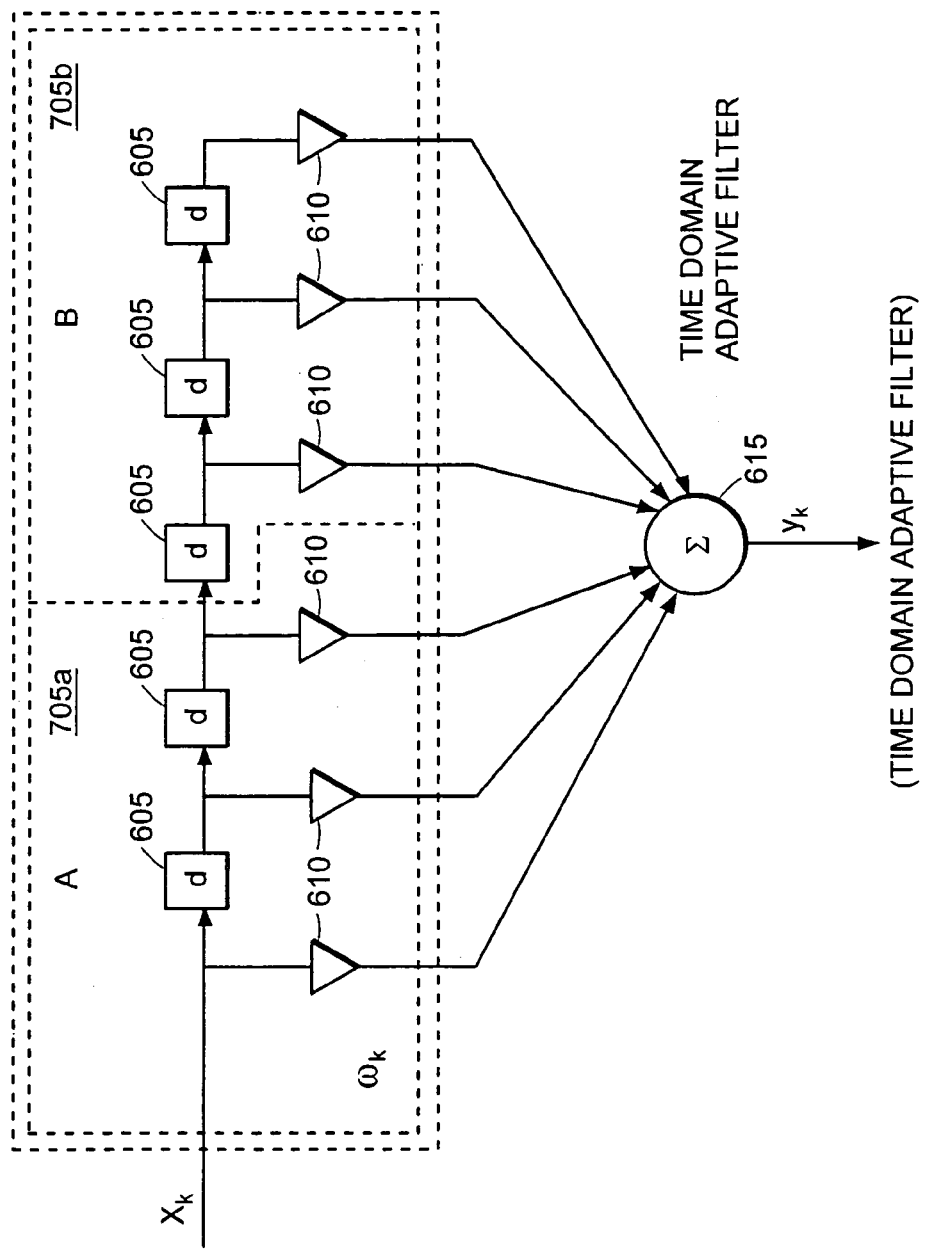
FIG. 7 (TIME DOMAIN ADAPTIVE FILTER)

US 7,103,177 B2

REDUCED COMPLEXITY TRANSFORM-DOMAIN ADAPTIVE FILTER USING SELECTIVE PARTIAL UPDATES

RELATED APPLICATIONS

This application claims the benefit of U.S. Provisional Application No. 60/350,489, filed Nov. 13, 2001 and U.S. Provisional Application No. 60/396,298, filed Jul. 16, 2002. The entire teachings of the above applications are incorporated herein by reference.

BACKGROUND OF THE INVENTION

Adaptive filters can be used in various systems, but require powerful processors if time critical operation is needed. An example of such an application is an echo canceller in a telecommunications system.

FIG. 1 is a schematic diagram of an example prior art telecommunications system 100a in which an echo canceller 120 employs an adaptive filter. The telecommunications system 100a includes a near-end telephone 105a and a far-end telephone 105b. The near-end telephone 105a is connected to a near-end hybrid 110a via a telephone line 125a. The far-end telephone 105b is connected to a far-end hybrid 110b via a telephone line 125b. The near-end hybrid 110a is connected to the far-end hybrid 110b via telephone lines 130 and 135 that are part of a public switched telephone network (PSTN) 115. The echo canceller 120 resides in the PSTN to remove an echo signal caused by the far-end hybrid 110b as a result of hybrid mismatch.

FIG. 2 is a schematic diagram of an alternative example of the prior art telecommunications system 100b in which the near-end telephone 105a, near-end hybrid 110a, and associated telephone line 125a are replaced with a wireless subsystem 200. The wireless subsystem 200 includes a handset 205 connected to a base station 210 via a wireless link 215. The wireless subsystem 200 also includes a mobile station controller (MSC) 220 connected to the PSTN 115, having the echo canceller 120 with adaptive filter, that transmits voice signals via the telephone lines 130 and 135 to the far-end hybrid 110b.

FIGS. 3–5 are schematic diagrams of adaptive filters used in various applications.

FIG. 3 provides details of the echo cancellation application in the prior art telecommunications systems of FIGS. 1 and 2. Referring to FIG. 3, in general, the echo canceller 120 determines and cancels echos received from an unknown system 505, where the unknown system 505 includes the set of transmission lines 130, 135 and the far-end hybrid 110b. Because of a hybrid mismatch, an echo signal 510 travels from the far-end hybrid 110b via the telephone line 135 back to the echo canceller 120.

The echo canceller 120 includes an adaptive filter 320a that uses adaptive filter parameters, $w_k$, or weights. A summing unit 315 sums the output, $y_k$, of the adaptive filter 320a with a far-end signal, $d_k$, which is composed of the echo signal 510, far-end speech, and noise. The output from the summing unit 315 is an error signal, $e_k$, which is just the far-end speech and noise if the adaptive filter 320a in the echo canceller 120 perfectly matches the echo signal 510.

FIG. 4 is an example of the adaptive filter 320a used in a prior art system identification application 300. The adaptive filter 320a is used in concert with the summing unit 315 to determine characteristics of an unknown plant 310. If the squared error, $|e_k|^2$, is minimal, then the adaptive filter 320a has reached convergence, and the characteristics of the unknown plant 310 are determined from converged parameters in the adaptive filter 320a.

FIG. 5 is a schematic diagram of a channel equalization application 400 in which the adaptive filter 320a is used to determine characteristics of a channel 410, such as a speech channel in the PSTN 115 (FIG. 1). A delay unit 405 is used to estimate the delay of the channel 410. If the squared error, $|e_k|^2$, is minimized, then the adaptive filter 320a has reached convergence and has removed distortion the channel 410 may have added to a signal traveling in the channel 410. The characteristics of the channel 410 can be determined as a function of the adaptive filter parameters, $w_k$, in the adaptive filter 320a.

In channel equalization applications, slow convergence of adaptive filters can result from an existence of deep nulls in the channel frequency response. This invariably leads to a large eigenspread and a requirement for long channel equalizers in the case of baud-rate sampling. In acoustic echo cancellation applications, the echo path is estimated by an adaptive filter. The acoustic echo path often requires a large number of parameters for adequate modeling. Speech signals also present a particularly challenging case because they tend to be non-stationary and to have lowpass spectral features.

SUMMARY OF THE INVENTION

Computational complexity and convergence speed are two important considerations for stochastic gradient descent adaptive filtering algorithms. The computational complexity of the least-mean-square (LMS) algorithm for an N-tap adaptive filter is O(N). The convergence rate of LMS is dependent on the eigenspread or the condition number (the ratio of the largest eigenvalue to the smallest eigenvalue) of the autocorrelation matrix of the input signal. Difficult adaptive filtering problems present long adaptive filters (i.e., large N) and input signals with large eigenspread. The resulting adaptive filter tends to have large computational complexity and slow convergence characteristics.

A remedy for slow convergence is to whiten the adaptive filter input signal by using an orthogonal transformation and power-normalization. This is often referred to as transform-domain adaptive filtering. While the use of orthogonal transformation and power-normalization speeds up the algorithm convergence by reducing the eigenspread of the adaptive filter input signal, it leads to no reduction in the number of filter parameters.

Before discussing transform-domain adaptive filtering, a discussion of time domain adaptive filtering using selective partial updates will be discussed in reference to FIGS. 6 and 7.

FIG. 6 is a detailed schematic diagram of the adaptive filter 320a implemented in a time domain structure. The time domain adaptive filter 320a is composed of filter parameters 600, where the filter parameters 600 include delay elements 605 and weights 610 with which the input signal, $x_k$, is multiplied, as shown. The outputs from the multipliers 610 are added together by a summing unit 615. The summed output, $y_k$, from the summing unit 615 is used to determine the error between the input, $x_k$, and an output from a system or channel being analyzed, as described above in reference to FIGS. 3–5.

The adaptive filter 320a of FIG. 6 is an example of a time domain adaptive filter, discussed in a paper by K. Dogancay and O. Tanrikulu, "Selective-Partial-Update NLMS and Affine Projection Algorithms for Acoustic Echo Cancellation," in *Proc. of IEEE Int'l Conf. on Acoustics Speech and*

Signal Processing, ICASSP 2000, Istanbul, Turkey, June 2000, vol. 1, pp. 448–451. When used to model the unknown plant 310 (FIG. 4), for example, the filter may become too long (e.g., filter parameters ranging in the hundreds or thousands), which may be too costly in terms of processing time or computer memory.

In terms of processing time, the problem with the time domain adaptive filter structure 320a is that the signals at each multiplier 610 are highly correlated, since each such signal is one time sample away from the previous and next signal at the previous and next multiplier, respectively. This degree of correlation causes each coefficient to be correlated and interdependent with the other coefficients. So, the slowest converging coefficient controls the convergence of the entire filter.

In the event the filter 320a is a long filter but there are not enough computing resources (i.e., computing time, memory, etc.) to adequately support the long filter, then one way to save on computing resources is to select a subset of filter parameters to update rather than trying to update all filter parameters at each filtering iteration.

FIG. 7 is an example of the time domain adaptive filter 320a that has its filter parameters separated into two different subsets of filter parameters: subset A 705a and subset B 705b. In this example, the subsets 705a, 705b include two subsets of three parameters (i.e., delays 605 and weights 610). Alternatively, the subsets 705a, 705b may include (i) three subsets of two parameters, (ii) one subset of two parameters and one subset of four parameters, or (iii) six subsets of one parameter. The tradeoff is that the finer the granulation, the higher the need for computing resources for subset selection.

Some prior art adaptive filters have employed heuristic techniques to determine which subset of filter parameters is to be updated at each iteration. In the above-referenced paper published by these same inventors, a closed-form solution was presented for determining which subset of filter parameters to update if a processor, on which the adaptive filter is executed, does not have enough computing resources to change all of the filter parameters each iteration.

A full derivation of the closed-form solution can be found in K. Doğançay and O. Tanrikulu, "Selective Partial Update NMLS and Affine Projection Algorithms for Acoustic Echo Cancellation," in *Proc. of IEEE Int. Conf on Acoustics, Speech, and Signal Processing*, ICASSP 2000, Istanbul, Turkey, June 2000, vol. 1, pp. 448–451. A subset of the derivation is repeated below.

The closed-form solution can be solved by starting with a constrained optimization equation:

$$\min_{w_{k+1}} \{\|w_{k+1} - w_k\|_2^2\} s \cdot t \cdot x_k^T \cdot w_{k+1} = d_k$$

In this equation, a cost function is solved by minimizing the difference between a next-coefficient, $\omega_{k+1}$, and the current coefficient $w_k$ such that the input signal multiplied by the next coefficient is equal to the echo signal, $d_k$. The constraining terms are referred to as a posteriori output since they look at the next coefficient rather than the previous coefficient, which would be used in an a priori output scenario.

Solving the above equation, it should be noted that in this time domain closed-form solution, all of the coefficients are updated and, if the error is zero, the next coefficient is equal to the present coefficient:

$$w_{k+1} = w_k + \frac{1}{\|x_k\|_2^2} e_k \cdot x_k$$

So, to reduce the computation time of having to update every coefficient at every iteration, a second minimizing function is applied. In this second minimizing function, the index 'i' refers to the subsets of parameters, and the subset of parameters selected to be updated is that which is determined to be the minimum of the following equation:

$$\min_{1 < i < M} \left\{ \min_{w_i(k+1)} \|w_i(k+1) - w_i(k)\|_2^2 \right\} s \cdot t \cdot w^T(k+1)x_k = d_k$$

Similarly, the parameter subset index is applied to the following equation:

$$w_{k+1,i} = w_{k,i} + \frac{1}{\|x_{k,i}\|_2^2} e_k x_{k,i},$$

which can be solved as:

$$(w_{k+1,i} - w_{k,i}) = \frac{1}{\|x_{k,i}\|_2^2} e_k x_{k,i}.$$

Thus, the parameter subset to be updated can be determined by solving the following equation:

$$i = \underset{j}{\operatorname{argmin}} \left( \left\| \frac{e_k x_{k,j}}{\|x_{k,j}\|_2^2} \right\|_2^2 \right)$$

which reduces to:

$$i = \underset{j}{\operatorname{argmax}} \|x_{k,j}\|_2^2.$$

So, according to the closed-form solution, the parameter subset to update is the one that gives the maximum sum of squares, which leads to faster convergence of the filter than updating a random subset or sequential updating.

Although a level of improvement is found for the time-domain adaptive filter of FIG. 7 by selecting a given subset of adaptive filter parameters to update at each iteration rather than updating all parameters, the time-domain adaptive filter is inherently slow to converge due to the correlation between signals at each multiplier. Thus, convergence of the overall time domain adaptive filter is only as fast as the slowest converging adaptive filter parameter.

In contrast, a transform-domain or frequency-domain adaptive filter operates in parallel in that the adaptive filter parameters are applied to signals in different frequency bins in parallel. Because there is not the same level of correlation between signals at each multiplier, the transform-domain adaptive filter converges faster than the time-domain adaptive filter, albeit at the expense of a more complex filter structure.

To achieve further improvement in performance by a transform-domain adaptive filter, similar to the time-domain adaptive filter approaches discussed above, the number of transform-domain filter parameters adapted at each iteration can also be reduced by use of selective partial updating of the adaptive filter parameters. This updating may be based on a constrained minimization problem, optionally including calculating a squared-Euclidean-norm. The result of this approach is to segment the adaptive filter parameters into subsets and choose a subset, or block, to update at each iteration. A normalization process applied to at least two frequency bins prior to multiplication by the adaptive filter parameters is used to prevent an adaptive filter "lock-up" that may be experienced in the event of high energy levels of signals in particular frequency bins. Thus, convergence of the transform domain filter is ensured at a rate generally faster than the convergence rate of a corresponding time-domain adaptive filter.

This transform-domain adaptive filter may be used for various applications, including system identification, channel equalization, or echo cancellation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is the schematic diagram of FIG. 6 in which the adaptive filter has parameters organized in subsets;

DETAILED DESCRIPTION OF THE INVENTION

A description of preferred embodiments of the invention follows.

Figure 1:
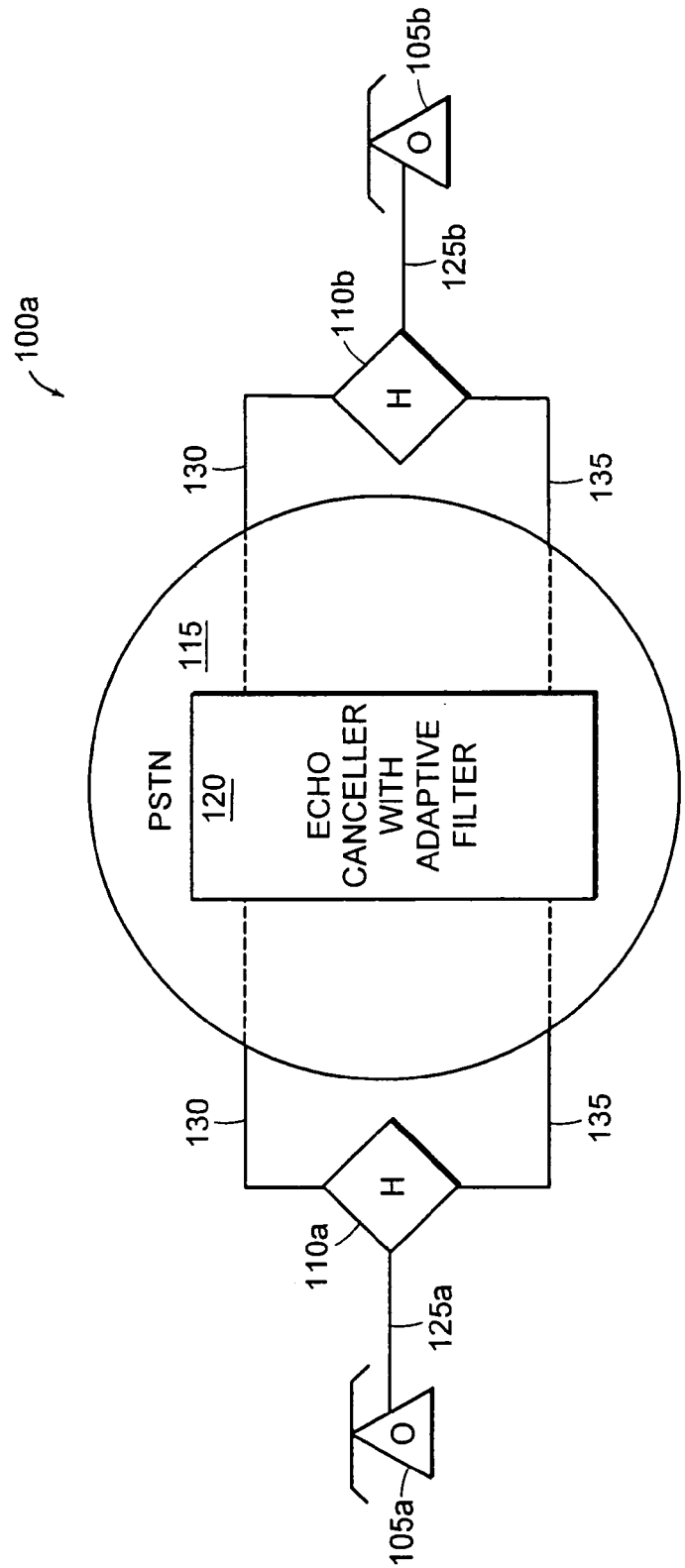
FIG. 1 is a schematic diagram of a telecommunications system having an echo canceller with an adaptive filter.
Figure 2:
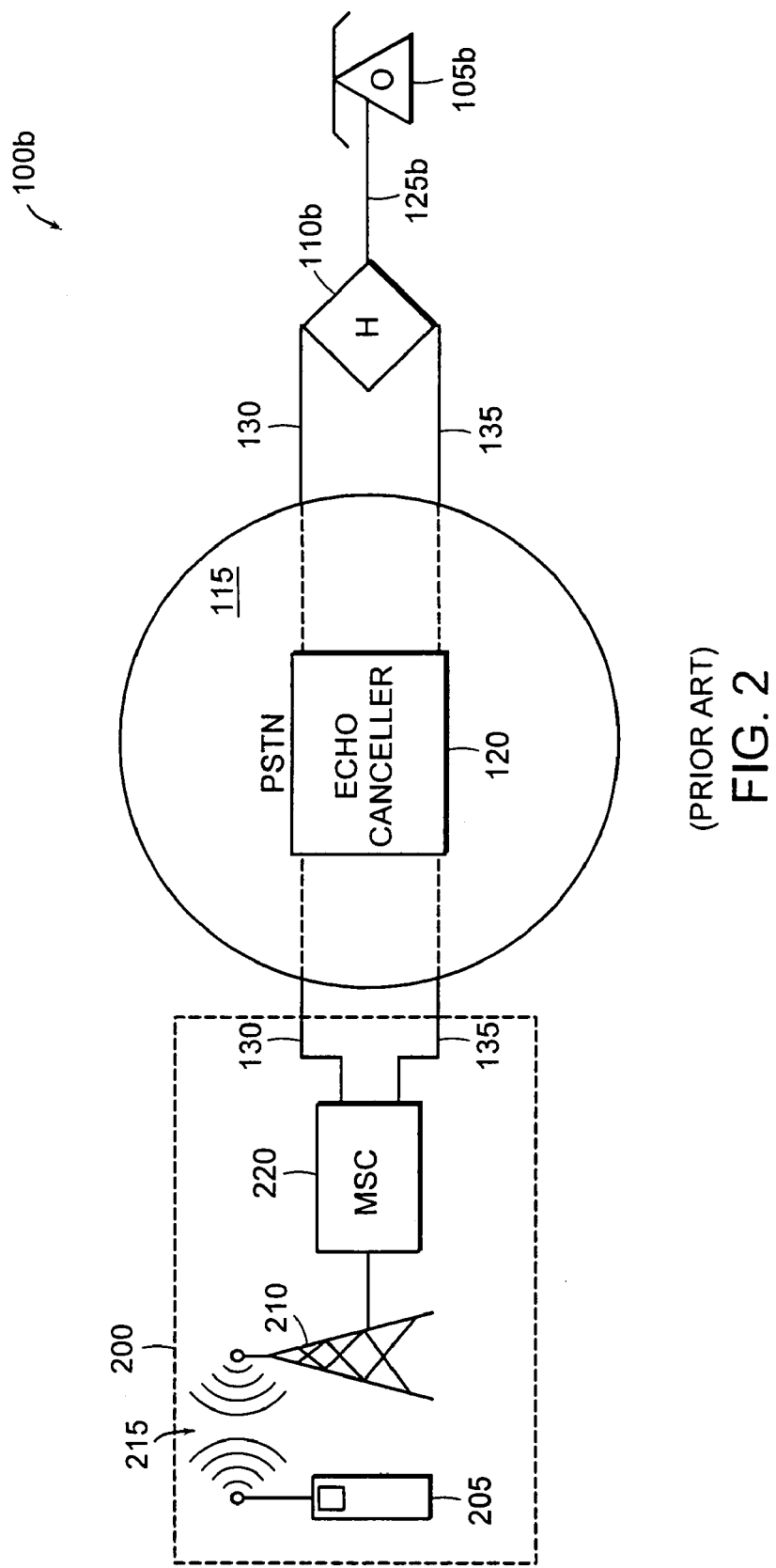
FIG. 2 is a schematic diagram of a telecommunications system having a wireless subnetwork and using the echo canceller of FIG. 1.
Figure 3:
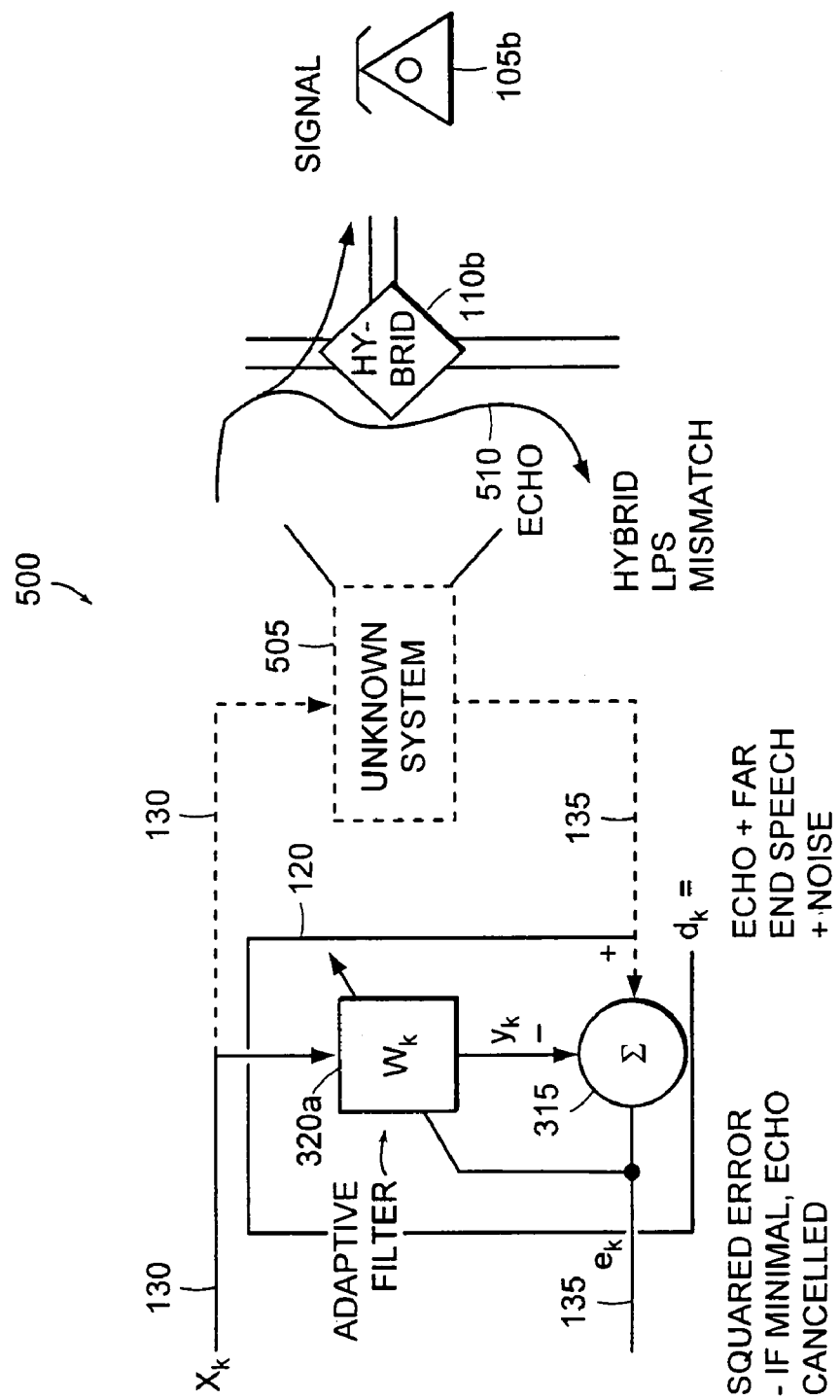
FIG. 3 is a schematic diagram of the adaptive filter of FIG. 1 used in an echo cancelling application.
Figure 4:
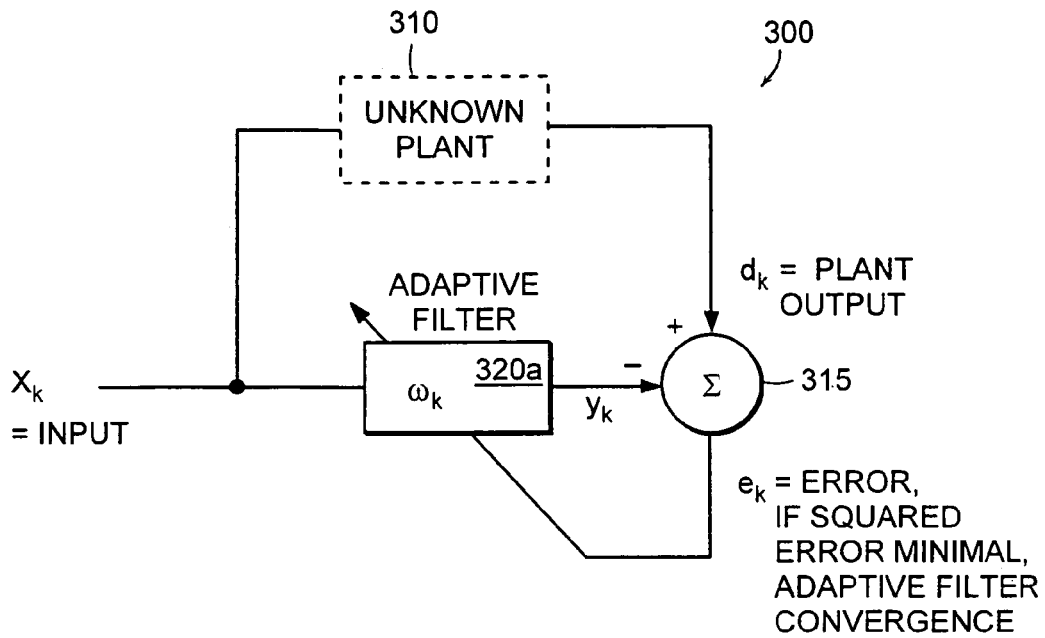
FIG. 4 is a schematic diagram of the adaptive filter of FIG. 1 used in a system identification application.
Figure 5:
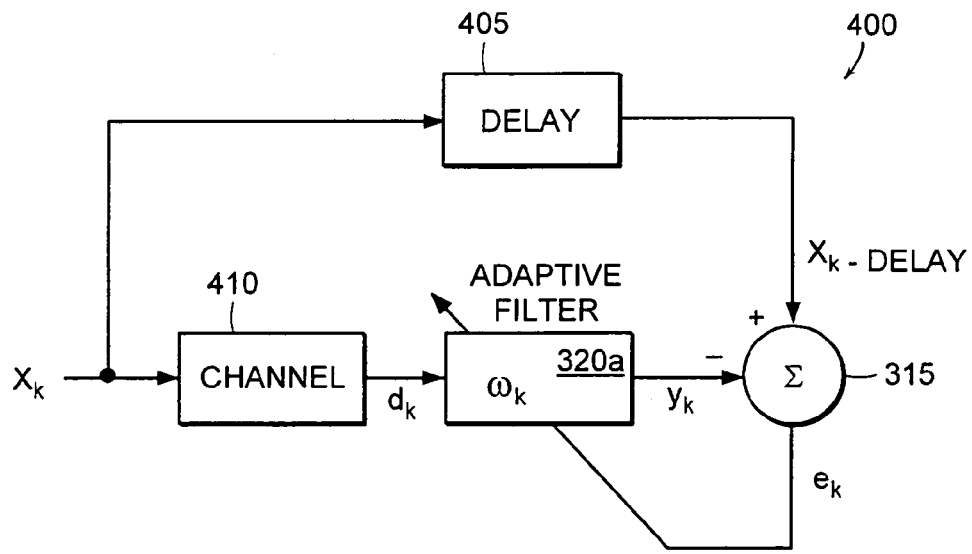
FIG. 5 is a schematic diagram of the adaptive filter of FIG. 1 used in a channel equalization application.
Figure 6:
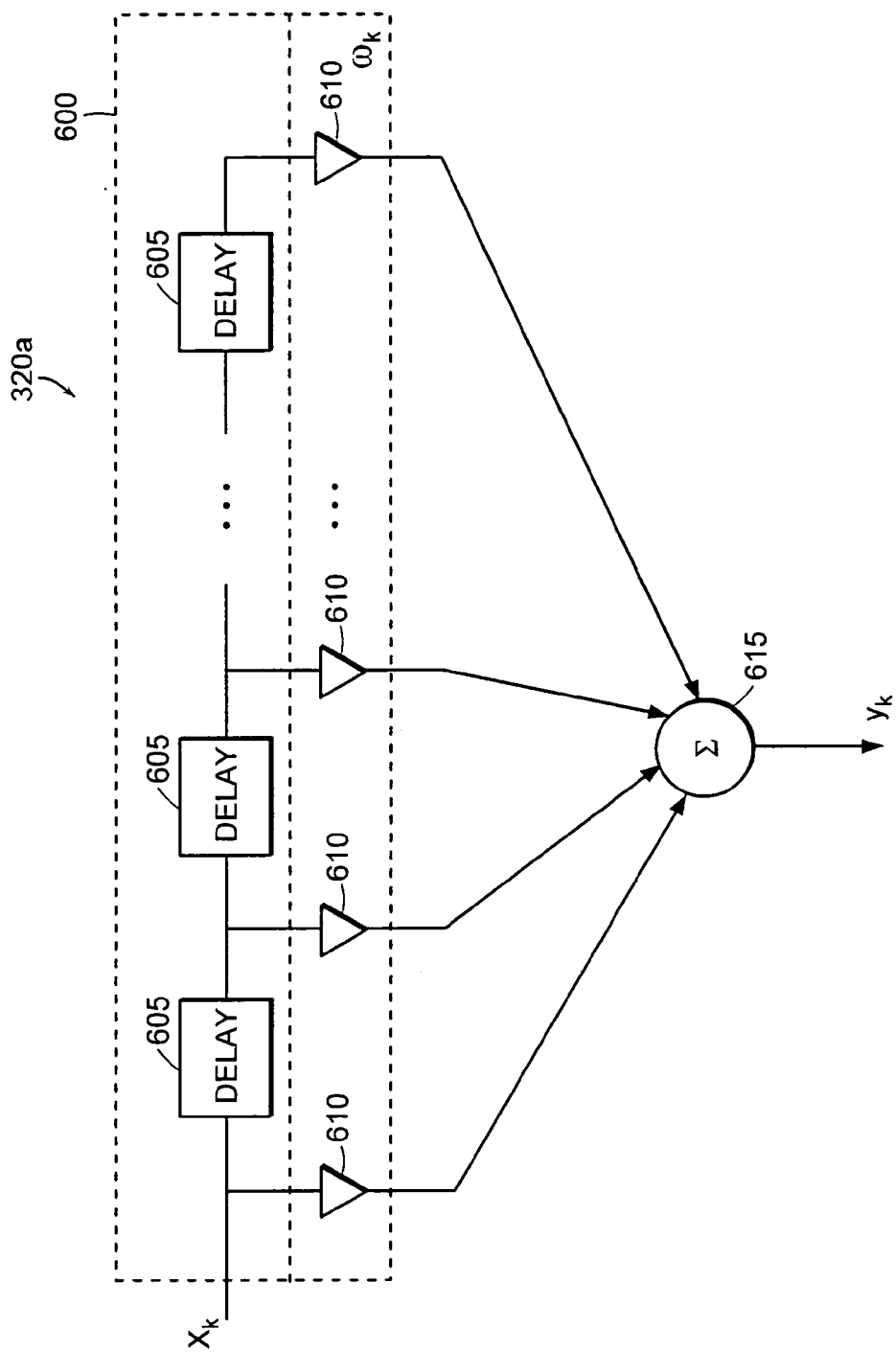
FIG. 6 is a schematic diagram of the adaptive filter of FIG. 1 implemented in a time-domain structure.
Figure 8A:
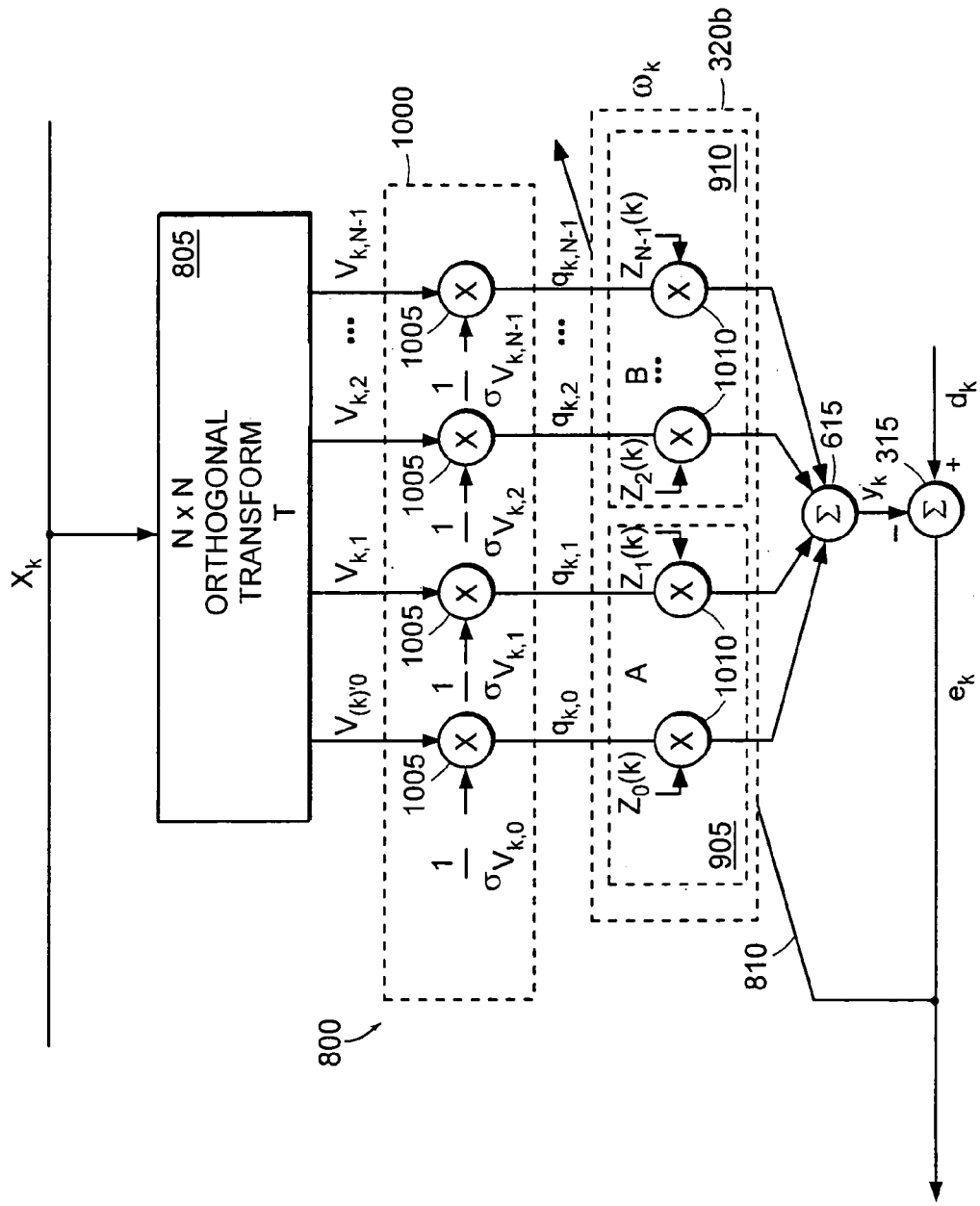
FIG. 8A is a schematic diagram of an inventive transform-domain adaptive filter that may be employed in the applications of FIGS. 3–5.

FIG. 8A is a schematic diagram of the inventive transform-domain adaptive filter 800. The adaptive filter 800 is a transform away from the time-domain adaptive filter described above in reference to FIG. 7. Although transform domain filters require more memory and are more complex, they have faster convergence than time-domain adaptive filters, even though time-domain adaptive filters are simpler in implementation. The reason for the faster convergence is that the signals being processed are separated into frequency bins, and the signals in each of the frequency bins are not correlated as in the case of the time-domain adaptive filter, as discussed above. A unique problem with the transform-domain adaptive filter not found in the case of time domain adaptive filter is referred to as "lock-up," which was learned during the design and implementation of this transform-domain adaptive filter 800.

In teleconferencing equipment on the user's side of a telecommunications network, there is typically only one line. Higher cost for inefficient echo cancellation processing, which drives the cost of the equipment higher than would a more efficient echo cancelling processing model, is absorbed by the end user. However, on the network side where network service providers absorb the cost of a large number of lines, inefficient echo cancellation processing is more important for cost and speed of service reasons. Echo cancellers having the inventive transform-domain adaptive filter 800 can support both end users and network service providers and can reduce the costs for the network service providers resulting from efficiency and convergence speed.

Referring to FIG. 8A, the transform-domain adaptive filter 800 receives a time-domain input signal, $x_k$, at an orthogonal transform unit 805. The orthogonal transform unit 805 performs a time-to-frequency domain transform to provide signals in distinct frequency bins for further processing in the frequency domain. Candidate orthogonal transforms are the Discrete Fourier Transform (DFT), Discrete Cosine Transform (DCT), Discrete Hartley Transform (DHT), and Walsh-Hadamard Transform (WHT), to name a few. It should be understood that non-orthogonal transforms may also be employed.

In this particular embodiment, for N=4, the orthogonal transform unit 805 outputs frequency signals in four different frequency bins, referred to as: $v_{k,0}$, $v_{k,1}$, $v_{k,2}$, and $v_{k,3}$.

The four frequency bin signals have instantaneous energy levels and are normalized by a normalizing processor 1000. In this particular embodiment, the normalizing processor 1000 includes four multipliers 1005, which multiply the respective signals in each of the frequency bins by one-divided-by a respective, square root of average, energy level (1/σ), where σ is the square root of the average energy level.

Figure 9:
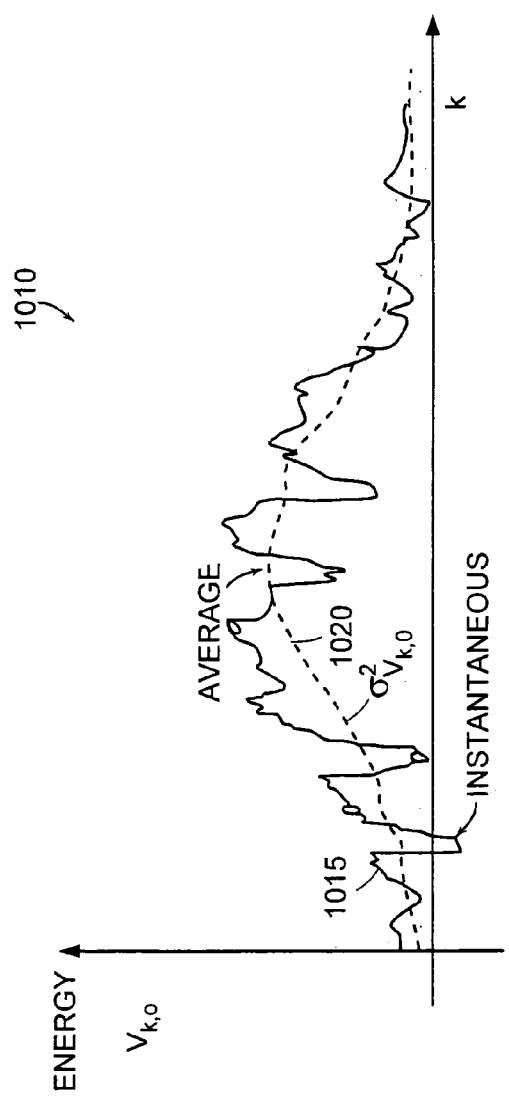
FIG. 9 is a plot of energy versus time for a signal in a frequency bin in the adaptive filter of FIG. 8A.

FIG. 9 provides a time plot having the instantaneous energy levels of the zero'th frequency bin signal, $v_{k,0}$, and the average energy level of that signal over time, $\sigma^2 v_{k,0}$. An example of an equation that can be used to calculate the average energy level is:

$$\sigma_i^2(k) = \alpha \sigma_i^2(k-1) + (1-\alpha)|v_{k,i}|^2, \text{ where } \alpha=0.95.$$

This equation includes a scale factor, α, that is used to balance the average energy of the frequency bin signal as a function of the previous average energy level and the present instantaneous energy level of the signal.

The normalizing unit 1000 prevents the adaptive filter 800 from going into a lock-up mode. The cause for the lock-up mode can be understood from an energy diagram in FIG. 10.

Figure 10:
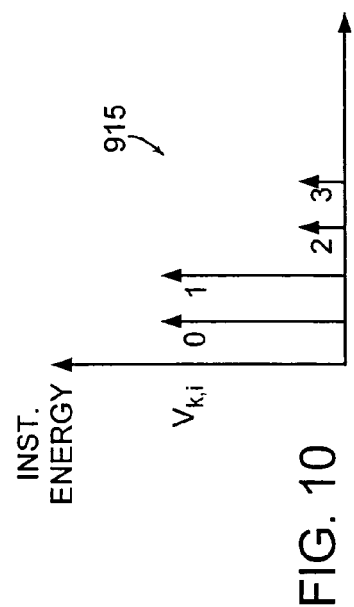
FIG. 10 is an energy plot for the four frequency bins in the adaptive filter of FIG. 8A.

Referring to FIG. 10, four energy levels, one corresponding to each frequency bin 0, 1, 2, 3, are shown as instantaneous energy vectors 915. The zero'th and first energy levels are much higher than the second and third energy levels. Because of this disparity, without the normalizing unit 1000, the zero'th and first adaptive filter parameters would be adjusted at each iteration while the second and third adaptive filters would not be adjusted, which is defined as a lock-up mode. Thus, the adaptive filter 800 would not achieve convergence without the normalizing unit 1000 since the second and third adaptive filter parameters would not reach convergence.

Referring again to FIG. 8A, following the normalizing unit 1000, the adaptive filter 800 has a set of multipliers 1010 that multiply the normalized signals in the frequency bins, $q_{k,0}$, $q_{k,1}$, $q_{k,2}$, ..., $q_{k,N-1}$, by respective adaptive filter parameters, $z_0(k)$, $z_1(k)$, $z_2(k)$, ..., $z_{N-1}(k)$.

To minimize need for computing resources, not all of the adaptive filter parameters are updated each iteration. In support of this minimization, the frequency domain adaptive filter parameters 320b are separated into subsets A 905 and B 910, where, in this case, each subset 905 and 910 includes two adaptive filter parameters.

In this particular embodiment, the adaptive filter 800 selects which subset of adaptive filter parameters to update by solving a constrained minimization equation. The constrained minimization equation may include calculating a squared-Euclidean-norm of the normalized signals in the frequency bins.

After the normalized signals q(k) have been combined with the adaptive filter parameters, $z_i(k)$, the weighted signals of the frequency bins are summed together by a summing unit 615. The output from the summing unit 615 is referred to as the output signal, $y_k$. This output signal, $y_k$, is subtracted from an external signal, $d_k$, by a summing unit 315.

The sum of the external signal, $d_k$, and a negative value of the output signal, $y_k$, results in an error signal, $e_k$, which is fed back to the adaptive filter 800 via a feedback path 810 to allow the adaptive filter 800 to adjust its filter parameters, z(k). When the squared error, $|e_k|^2$, has reached a minimum, the adaptive filter 800 has converged to a solution.

The converged adaptive filter 800 provides information based on the application in which it is employed. For example, the adaptive filter parameters can be used to cancel an echo signal in a signal in a telecommunications application, identify a system in a systems identification application, or determine the characteristics of a channel in a channel equalization application. In the echo signal cancellation application, when the adaptive filter 800 has converged to a solution, the echo signal in the time domain signal related to the frequency domain signals has been minimized.

Figure 11:
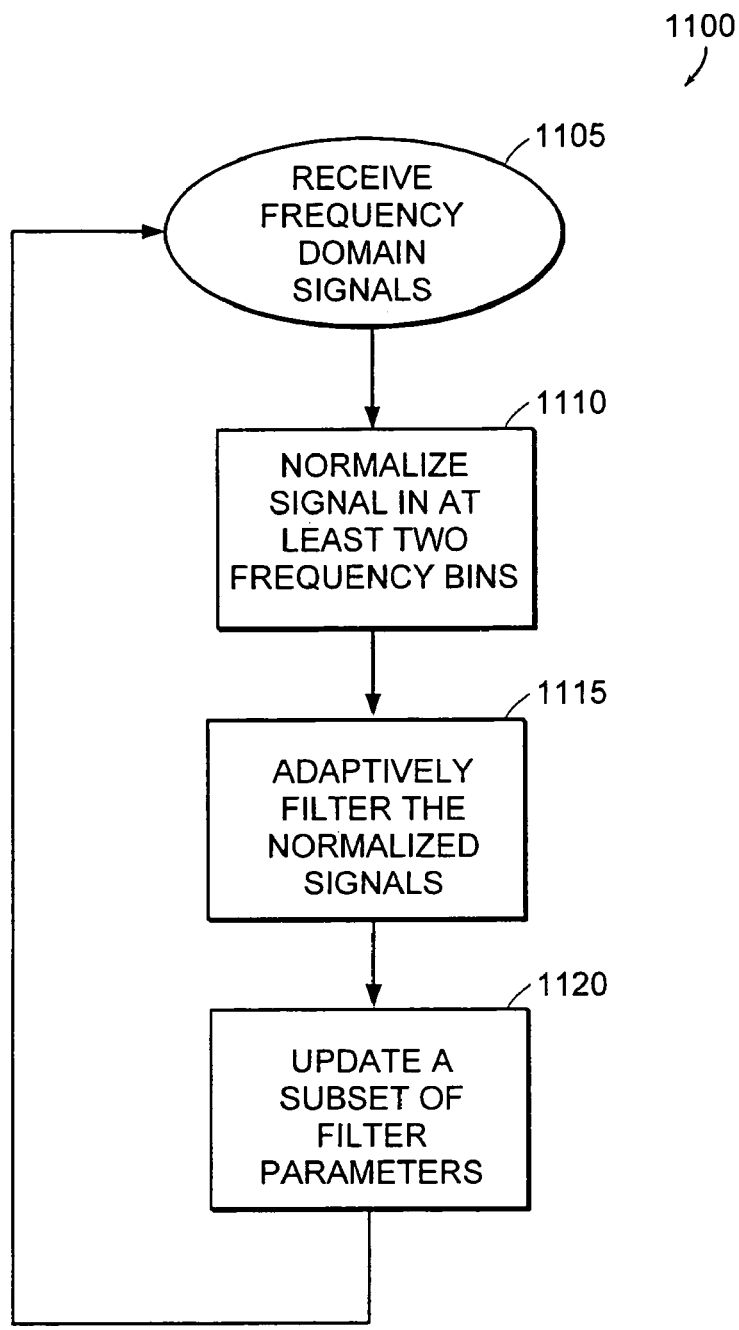
FIG. 11 is a flow diagram of a process executed by the adaptive filter of FIG. 8A.

FIG. 11 is a flow diagram of a process 1100 executed by the inventive adaptive filter 800 of FIG. 8A. The process 1100 begins in step 1105 after receiving the frequency domain signals. In the embodiment of the adaptive filter 800 of FIG. 8A, an N×N orthogonal transform 805 provides the frequency domain signals $v_{k,0}$, $v_{k,1}$, and so forth. In step 1110, the process 1100 normalizes the frequency domain signals in at least two frequency bins. In the adaptive filter 800 of FIG. 8A, there may be four frequency bins that are normalized.

In step 1115, the process 1100 adaptively filters the normalized signals, $q_{k,0}$, $q_{k,1}$, ..., $q_{k,N-1}$. In step 1120, the process 1100 updates a subset of filter parameters. The process 1100 repeats with the updated subset of filter parameters among the other subset(s) of filter parameters.

Figure 8B:
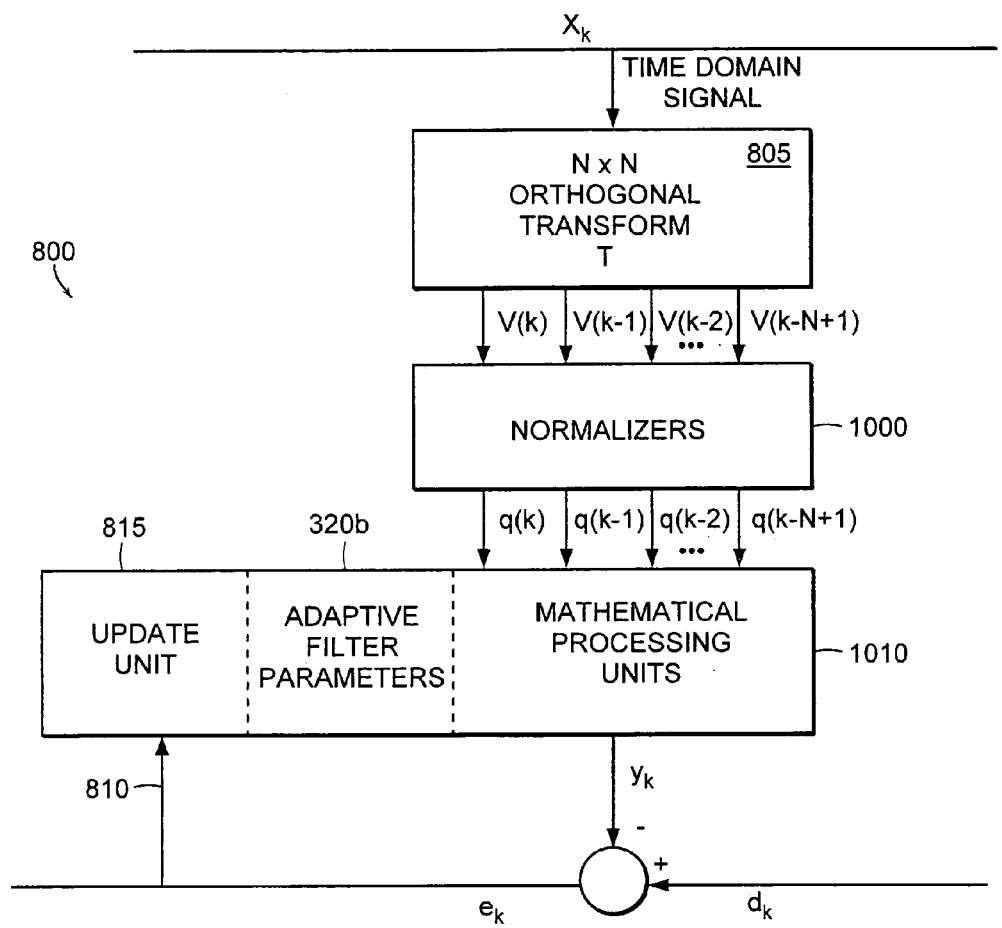
FIG. 8B is a block diagram of the adaptive filter of FIG. 8A.

FIG. 8B is a block diagram of the adaptive filter 800 of FIG. 8A. The adaptive filter parameters 320b and mathematical processing units 1010 are indicated as separate blocks. An update unit 815 is defined as a separate block for completeness but should be understood as being inherently part of the adaptive filter 800 in FIG. 8A. The update unit 800 may have access to all of the data received from the normalizers 1000, adaptive parameters 320b, output $y_k$ from the mathematical processing units 1010, and error $e_k$. The update unit 800 uses a subset of the data to determine "next" values of a subset of the adaptive filter parameters 320b. The update unit 815 may use the equations discussed herein to determine the "next" values.

It should be understood that the adaptive filter 800 may be implemented in software and executed using hardware, for example, a digital signal processor (not shown). The block diagram of FIG. 8B and schematic diagram of FIG. 8A are merely representations of the software and hardware and in no way intended to be limiting. Alternative representations and descriptors may be used to show and describe the processing. Alternative forms of hardware and software may be used to implement the adaptive filter, such as parallel processors, general purpose computers, matrix processors, distributed processors, and software operating thereon, respectively.

The following discussion provides mathematical details for the inventive transform-domain adaptive filter 800 discussed above.

For an adaptive filter of length N with regressor vector $x(k)=[x(k), x(k-1), \ldots, x(k-N+1)]^T$ and parameter vector $\omega(k)=[\omega_0(k), \omega_1(k), \ldots, \omega_{N-1}(k)]^T$, the LMS algorithm is given by the recursion $$\omega(k+1)=\omega(k)+\mu e(k)x(k) \qquad (1)$$

where μ is a positive stepsize, which controls the speed of convergence, and e(k) is the error signal given by e(k)=d(k)−y(k). Here, d(k) is the desired filter response, and y(k) is the filter output $y(k)=w^T(k)x(k)$. The convergence speed of the LMS algorithm in equation (1) is sensitive to the condition number of the autocorrelation matrix of x(k). If the condition number is large, LMS is expected to have a slow rate of convergence. Whitening (i.e., decorrelating) the input signal can be considered as a remedy for this problem by reducing the eigenspread.

Transforming the regressor vector x, using an N×N orthogonal transformation, denoted T, a transform vector is produced, where:

$$v(k)=[v_{k,0}, v_{k,1}, \ldots, v_{k,N-1}]^T = Tx(k).$$

The matrix T is a unitary matrix (i.e., $T^H T = T T^H = I$). Candidate orthogonal transforms are the discrete Fourier transform (DFT), discrete cosine transform (DCT), discrete Hartley transform (DHT), and Walsh-Hadamard transform (WHT), to name but a few. The entries of the transformed vector v(k) are (approximately) uncorrelated with variances $\sigma_i^2 = E\{|v_{k,i}|^2\}$, i=0, 1, ..., N−1. If $\sigma_i^2$ were known a priori, the entries of v(k) could be normalized to yield entries with unit variance:

$$q(k)=\Lambda^{-1}v(k)$$

where Λ is a diagonal autocorrelation matrix defined by $$\Lambda = \begin{bmatrix} \sigma_0 & & 0 \\ & \sigma_1 & \\ & & \ddots \\ 0 & & \sigma_{N-1} \end{bmatrix}.$$

The vector q(k) with unit variance (i.e., approximately uncorrelated entries) is applied to an adaptive filter with parameters $z(k)=[z_0(k), z_1(k), \ldots, z_{N-1}(k)]^T$. See W. K. Jenkins, A. W. Hull, J. C. Straight, B. A. Schnaufer, and X.

Li, *Advanced Concepts in Adaptive Signal Processing*, Kluwer, Boston, 1996. FIG. 8A, discussed above, depicts the resulting transform-domain adaptive filter. The filter parameters z(k) can be adapted by using the LMS algorithm:

$$z(k+1)=z(k)+\mu e(k)q^*(k)$$

where * denotes complex conjugate and $$e(k)=d(k)-z^T(k)q(k).$$

The power-normalization can be absorbed into the adaptive filter parameters using $$w(k)=\Lambda^{-1}z(k) \quad (2)$$

which yields $$w(k+1)=w(k)+\mu e(k)\Lambda^{-1}q^*(k)$$

or $$w(k+1)=w(k)+\mu e(k)\Lambda^{-2}v^*(k). \quad (3)$$

This is the transform-domain LMS (TD-LMS) algorithm. The matrix $\Lambda^2$ is not readily available and needs to be estimated on-line. This can be done by using a sliding exponential window:

$$\sigma_i^2(k)=\alpha\sigma_i^2(k-1)+(1-\alpha)|v_{k,i}|^2, \; i=0, 1, \ldots, N-1$$

where $0<\alpha<1$.

Use of Selective-Partial-Updates:

The notion of selective-partial-updating stems from a desire to reduce the number of multiplications in the update term by adapting only a small number of the adaptive filter parameters. The regressor vector q(k) and the parameter vector z(k) can be partitioned into M blocks of length L=N/M, where L is an integer:

$$q(k)=[q_1^T(k)q_2^T(k) \ldots q_M^T(k)]^T$$

$$z(k)=[z_1^T(k)z_2^T(k) \ldots z_M^T(k)]^T.$$

Here, the parameter vector blocks $z_1(k), z_2(k), \ldots, z_M(k)$ represent candidate subsets of z(k) that can be updated at time instant k. For a single-block update, the following constrained minimization problem can be defined, which is solved by the NLMS algorithm:

$$\min_{1 \le i \le M} \min_{z_i(k+1)} \|z_i(k+1) - z_i(k)\|_2^2 \quad (4)$$

$$\text{subject to } z^T(k+1)q(k) = d(k)$$

Consider first the minimization problem for a given block. If i is fixed, equation (4) reduces to $$\min_{z_i(k+1)} \|z_i(k+1) - z_i(k)\|_2^2 \quad (5)$$

$$\text{subject to } z^T(k+1)q(k) = d(k)$$

which can be solved by using the method of Lagrange multipliers. See G. C. Goodwin and K. S. Sin, *Adaptive Filtering, Prediction, and Control*, Prentice Hall, New Jersey, 1984. The cost function to be minimized is $$J_i(k)=\|z_i(k+1)-z_i(k)\|_2^2+\lambda(d(k)-z^T(k+1)q(k))$$

where $\lambda$ is a Lagrange multiplier. Setting $\partial J_i(k)/\partial z_i(k+1)=0$ and $\partial J_i(k)/\partial \lambda=0$, we get $$z_i(k+1) - z_i(k) - \frac{\lambda}{2}q_i^*(k) = 0 \quad (6a)$$

$$d(k) - \underbrace{(z_i^T(k+1)q_i(k) + \bar{z}_i^T(k+1)\bar{q}_i^T(k))}_{z^T(k+1)q(k)} = 0 \quad (6b)$$

where $\bar{q}_i(k)$ is obtained from q(k) by deleting $q_i(k)$, and $\bar{z}_i(k+1)$ is defined likewise. Substituting (6a) into (6b), we get $$\frac{\lambda}{2} = \frac{d(k) - z_i^T(k)q_i(k) - \bar{z}_i^T(k+1)\bar{q}_i(k)}{q_i^H(k)q_i(k)} \quad (7a)$$

$$= \frac{d(k) - z^T(k)q(k)}{\|q_i(k)\|_2^2} \quad (7b)$$

$$= \frac{e(k)}{\|q_i(k)\|_2^2} \quad (7c)$$

where we have used $\bar{z}_i(k+1)=\bar{z}_i(k)$. After substituting (7c) into (6a) and introducing a small positive stepsize $\mu$, we obtain the following recursion to solve the fixed-block-update constrained minimization problem in (5):

$$z_i(k+1) = z_i(k) + \frac{\mu}{\|q_i(k)\|_2^2} q_i^*(k)e(k). \quad (8)$$

The selection of a block to be updated should be made by determining the block with the smallest squared-Euclidean-norm update (see equation (4)). Thus, the block to be updated at time instant k is given by $$i = \operatorname*{argmin}_{1 \le j \le M} \|z_j(k+1) - z_j(k)\|_2^2 \quad (9)$$

$$= \operatorname*{argmin}_{1 \le j \le M} \left\| \frac{q_j^*(k)e(k)}{\|q_j(k)\|_2^2} \right\|_2^2$$

$$= \operatorname*{argmin}_{1 \le j \le M} \frac{1}{\|q_j(k)\|_2^2}$$

$$= \operatorname*{argmin}_{1 \le j \le M} \frac{1}{\|q_j(k)\|_2^2}.$$

Equation (8) can be modified to incorporate the selection criterion (9). This yields the following selective-single-block-update NLMS algorithm:

$$z_i(k+1) = z_i(k) + \frac{\mu}{\|q_i(k)\|_2^2} q_i^*(k)e(k) \quad (10)$$

$$i = \operatorname*{argmin}_{1 \le j \le M} \|q_j(k)\|_2^2.$$

For white inputs, the NLMS algorithm does not offer any advantages over the LMS algorithm. Thus, one can drop the stepsize normalization to obtain the LMS version:

$$z_i(k+1) = z_i(k) + \mu q_i^*(k)e(k) \quad i = \underset{1 \le j \le M}{\operatorname{argmin}} \|q_j(k)\|_2^2. \qquad (11)$$

Using (2) in (11), we further obtain $$w_i(k+1) = w_i(k) + \mu \Lambda_i^{-2} v_i^*(k)e(k) \quad i = \underset{1 \le j \le M}{\operatorname{argmin}} \|q_j(k)\|_2^2 \qquad (12)$$

which is the transform-domain selective-partial-update LMS (TD-SPU-LMS) algorithm. In equation (12), $\Lambda_i$ is an L×L diagonal matrix defined through $$\Lambda = \begin{bmatrix} \Lambda_1 & & & \\ & \Lambda_2 & & \\ & & \ddots & \\ & & & \Lambda_M \end{bmatrix}.$$

The selective-partial-update algorithm in equation (12) can be generalized to multiple-block selection:

$$w_{I_B}(k+1) = w_{I_B}(k) + \mu \Lambda_{I_B}^{-2} v_{I_B}^*(k)e(k)$$

where $I_B = \{i : \|q_i(k)\|_2^2$ is one of the B largest in $\|q_1(k)\|_2^2, \ldots, \|q_M(k)\|_2^2\}$ where $I_B = \{i_1, i_2, \ldots, i_B\}$ is the set of selected blocks, determining which blocks to be retained in the parameter vector, regressor vector, and the autocorrelation matrix. For example, the vector $w_{I_B}(k)$ is defined by $$w_{I_B}(k) = [w_{i_1}^T(k), w_{i_2}^T(k), \ldots, w_{i_B}^T(k)]^T.$$

Note that setting M=N and B=M corresponds to the full-update TD-LMS in equation (3).

Computational Complexity

Selective-partial updating reduces the number of multiplications in the update term. For given B and M values, the computational complexity for the regressor vector in the update term is N B/M or BL (complex) multiplications, compared to N (complex) multiplications. The selection process introduces some overhead. If the Heapsort algorithm (see D. E. Knuth, *Sorting and Searching, vol. 3 of The Art of Computer Programming*, Addison-Wesley, Reading, Mass., $2^{nd}$ Edition, 1973) is used, the computational complexity for the selection of B blocks is a maximum of M $\log_2$ B comparisons. Comparing the savings in multiplications, (M−B)L=N−BL with the number of comparisons, it becomes clear that, for long adaptive filters (large N), the savings in multiplications exceeds the number of comparisons by a large margin. Because the regressor vector q(k) does not have a sliding window structure for successive k, the Sortline algorithm (see I. Pitas, "Fast algorithms for running ordering and max/min Calculation," *IEEE Trans. On Circuits and Systems*, vol. 36, no. 6, pp. 795–804, June 1989) is not applicable.

Computation of $\|q_i(k)\|_2^2$ can be done by means of a look-up table to further reduce the overhead associated with subset selection.

Simulation Examples

The application of the SPU-TD-LMS algorithm is now illustrated with a simple channel equalization problem. The channel input is assumed be a binary sequence taking on values ±1. The channel is a nonminimum-phase linear time-invariant system with a three-tap impulse response obtained from a sampled raised cosine (See S. Haykin, *Adaptive Filter Theory*, Prentice Hall, N.J., $3^{rd}$ edition, 1996):

$$h_k = \frac{1}{2}\left(1 + \cos\left(\frac{2\pi(k-1)}{W}\right)\right), k = 0, 1, 2.$$

The equalizer is an adaptive transversal filter with N=12 parameters. The channel output signal is distorted by additive white Gaussian noise with zero mean and variance 0.001. The parameter W controls the condition number of the autocorrelation matrix for the noisy channel output.

The full-update TD-LMS, SPU-TD-LMS and NLMS algorithms were simulated on this channel for two values of W. The length parameters of SPU-TD-LMS were chosen as M=6 and B=1. In other words, ⅙th of the equaliser parameters are adapted at every iteration. DCT was used to form the orthogonal transformation T.

Figure 12:
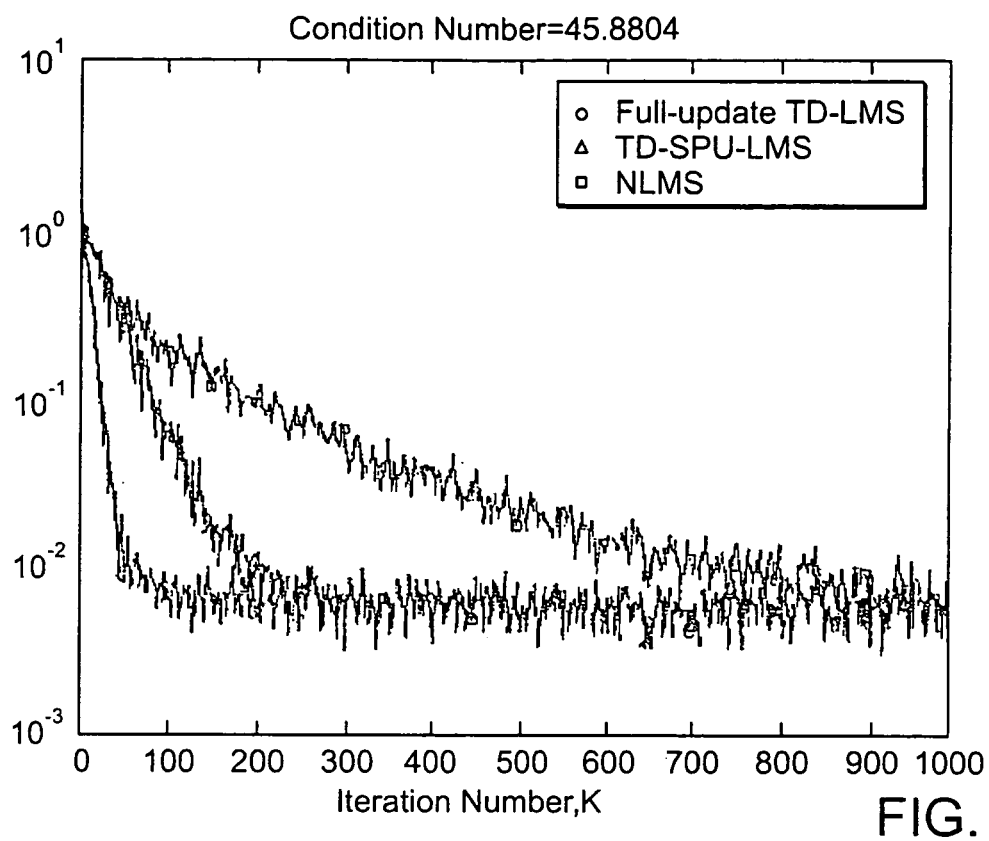
FIG. 12 is a graph of convergence curves for full-update TD-LMS, SPU-TD-MLS of FIG. 8A, and NLMS for W=3.5.

FIG. 12 shows the convergence curves for the three algorithms, averaged over 50 independent realizations, for W=3.5 (yielding a condition number of 48.8804). The stepsizes of the processes were chosen to attain approximately the same MSE after convergence.

Figure 13:
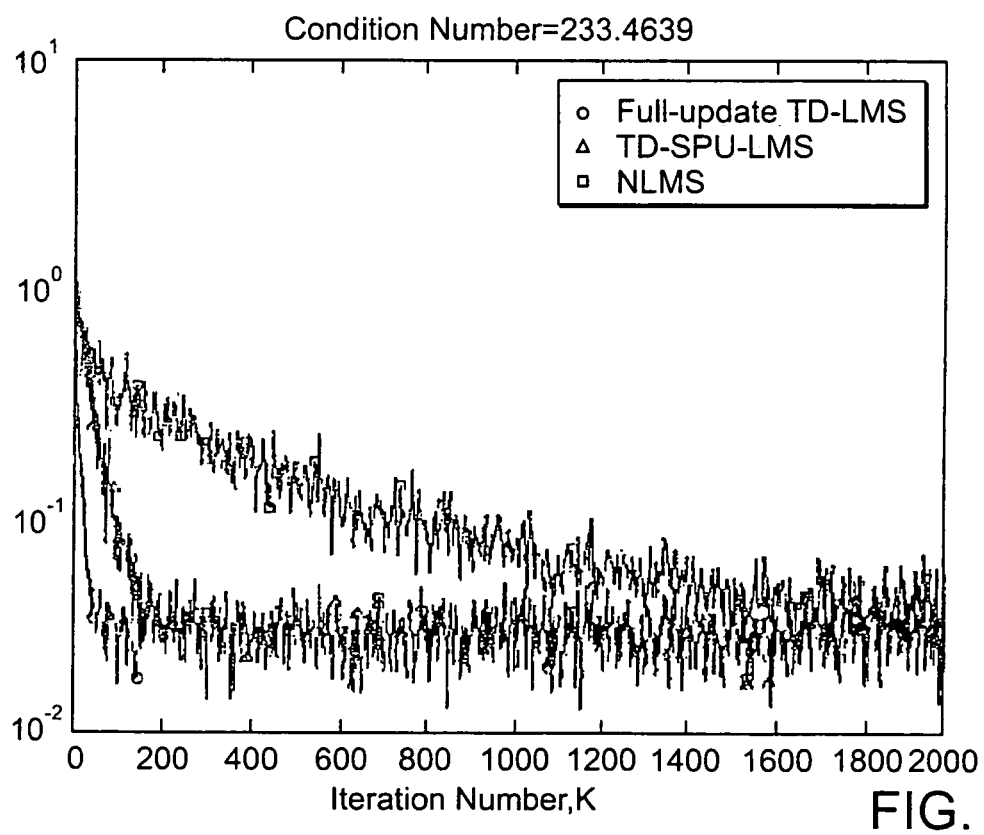
FIG. 13 is a graph of the convergence curves of FIG. 12 for W=3.8 to illustrate slower convergence.

FIG. 13 shows the same convergence curves for W=3.8, corresponding to a condition number of 233.4639 (i.e., the channel output signal is very ill-conditioned). Not surprisingly, the NLMS algorithm exhibits a very slow convergence for this channel.

In conclusion, a reduced-complexity TD-LMS process has been developed by employing selective-partial updating in parameter adaptation. A simple selection criterion is derived by drawing on the principle of minimum disturbance. The selection criterion picks the parameter blocks that correspond to the largest squared-Euclidean-norm regressor blocks. The regressor vector is obtained from the transformed time-domain regressor vector after power-normalizing the individual entries. The performance of the resulting reduced algorithm was simulated on a simple raised-cosine channel. The complexity reduction does not seem to slow down the convergence rate unduly. Compared with the NLMS algorithm, the SPU-TD-LMS has a very fast convergence speed.

It should be understood that the teachings provided herein may be implemented in software that can be stored or distributed in various forms of computer readable media, such as RAM, ROM, CD-ROM, magnetic disk, firmware, or other digital media. The software may also be downloaded across a computer network, such as the Internet. The software may be loaded and executed by a general or application-specific processor.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for performing adaptive filtering, the method comprising:
   normalizing frequency domain signals in at least two frequency bins;
   adaptively filtering the normalized frequency domain signals; and
   updating a given non-null subset of filter coefficients containing fewer than all filter coefficients used in the adaptive filtering, the given subset selected from among a plurality of subsets of filter coefficients used in the adaptive filtering based on a comparison of the given subset with other subsets of filter coefficients in the plurality of subsets at a present filtering iteration, the given subset and non-updated subsets of filter coefficients defining partially updated filter coefficients for adaptively filtering the normalized frequency domain signals at a next filtering iteration.

2. The method according to claim 1 wherein normalizing the frequency domain signals includes dividing instantaneous energy levels of the frequency domain signals in each frequency bin by respective average energy levels of the frequency domain signals in each of the frequency bins.

3. The method according to claim 1 wherein updating the given subset of filter coefficients includes solving a constrained minimization equation.

4. The method according to claim 3 wherein solving the constrained minimization equation includes calculating a squared-Euclidean-norm.

5. The method according to claim 1 wherein updating the given subset of filter coefficients includes determining which subset to update according to a least mean square (LMS) process.

6. The method according to claim 1 wherein updating the given subset of filter coefficients occurs at every iteration of the adaptive filtering.

7. The method according to claim 1 further including predefining the plurality of subsets of filter coefficients.

8. The method according to claim 1 wherein normalizing the frequency domain signals is done as a function of a previous average energy level and a present instantaneous energy level of the respective normalized frequency domain signals.

9. The method according to claim 8 wherein normalizing the frequency domain signals includes applying a scale factor to the previous average and present instantaneous energy levels of the respective, normalized, frequency domain signals to minimize a potential for adaptive filtering lock-up.

10. The method according to claim 1 further including performing a time-to-frequency domain transform to provide the frequency domain signals from an input signal.

11. The method according to claim 10 wherein the transform is an orthogonal transform.

12. The method according to claim 1 further including minimizing an echo signal in a time domain signal related to the frequency domain signals.

13. The method according to claim 12 wherein updating the given subset of filter coefficients includes targeting a burst echo signal in the time domain signal.

14. The method according to claim 1 used in at least one of the following applications:
    system identification, channel equalization, or echo cancellation.

15. An adaptive filter, comprising:
    normalizers to normalize frequency domain signals in at least two frequency bins;
    mathematical processing units coupled to the normalizers to combine the normalized frequency domain signals with respective adaptive filter coefficients; and
    an update unit to update a given non-null subset of filter coefficients containing fewer than all filter coefficients used in the adaptive filtering, the given subset selected from among a plurality of subsets of filter coefficients based on a comparison of the given subset with other subsets of filter coefficients in the plurality of subsets at a present filtering iteration, the given subset and non-updated subsets of filter coefficients defining partially updated filter coefficients that the mathematical processing units combine with the normalized frequency domain signals at a next filtering iteration.

16. The adaptive filter according to claim 15 wherein the normalizers include mathematical processing units to divide instantaneous energy levels of the frequency domain signals in the frequency bins by respective average energy levels.

17. The adaptive filter according to claim 15 wherein the update unit determines whether to update the given subset of filter coefficients by solving a constrained minimization equation.

18. The adaptive filter according to claim 17 wherein the update unit solves the constrained minimization equation by calculating a squared-Euclidan-norm.

19. The adaptive filter according to claim 15 wherein the update unit includes a least mean square (LMS) processing unit to determine which subset to update.

20. The adaptive filter according to claim 15 wherein the update unit updates the given subset of filter coefficients at every iteration.

21. The adaptive filter according to claim 15 wherein the plurality of subsets of filter coefficients are predefined.

22. The adaptive filter according to claim 15 wherein the adaptive filter updates the given subset of filter coefficients as a function of a previous average energy level and a present instantaneous energy level of the respective normalized frequency domain signals.

23. The adaptive filter according to claim 22 wherein the adaptive filter updates the given subset of filter coefficients by applying a scale factor to the previous average and present instantaneous energy levels of the respective, normalized, frequency domain signals to minimize a potential for adaptive filter lock-up.

24. The adaptive filter according to claim 15 further including a time-to-frequency domain transform unit to provide the frequency domain signals from an input signal.

25. The adaptive filter according to claim 24 wherein the transform unit is an orthogonal transform unit.

26. The adaptive filter according to claim 15 wherein the mathematical processing units output an echo cancellation signal; and further including
    a summing unit coupled to the adaptive filter and a far end of a communications system to calculate an error signal by summing (i) a returning far end signal having an echo signal and (ii) the echo cancellation signal.

27. The adaptive filter according to claim 26 wherein a feedback path couples the update unit to the summing unit to return the error signal to the update unit to allow the update unit to update the given subset of filter coefficients from among the plurality of subsets of filter coefficients to minimize the echo signal in the returning far end signal.

28. The adaptive filter according to claim 15 wherein the update unit updates the given subset of filter coefficients in a manner that targets a burst echo signal in the far end signal.

29. The adaptive filter according to claim 15 used in at least one of the following applications:

system identification, channel equalization, or echo cancellation.

30. An adaptive filter, comprising:

means for normalizing frequency domain signals in at least two frequency bins;

means for adaptively filtering the normalized frequency domain signals; and means for updating a given non-null subset of filter coefficients containing fewer than all filter coefficients used in the adaptive filtering, the given subset selected from among multiple subsets used in the adaptive filtering based on a comparison of the given subset with other subsets of filter coefficients in the multiple subsets at a present filtering iteration, the given subset and non-updated subsets of filter coefficients defining partially updated filter coefficients for adaptively filtering the normalized frequency domain signals at a next filtering iteration.

31. A computer-readable medium having stored thereon sequences of instructions, the sequences of instructions, when executed by a digital processor, causing the processor to perform the steps of:

normalizing frequency domain signals in at least two frequency bins;

adaptively filtering the normalized frequency domain signals; and updating a given non-null subset of filter coefficients containing fewer than all filter coefficients used in the adaptive filtering, the given subset selected from among a plurality of subsets of filter coefficients used in the adaptive filtering based on a comparison of the given subset with other subsets of filter coefficients in the plurality of subsets at a present filtering iteration, the given subset and non-updated subset subsets of filter coefficients defining partially updated filter coefficients for adaptively filtering the normalized frequency domain signals at a next filtering iteration.

* * * * *